(12) United States Patent
Manzi (10) Patent No.: US 8,718,119 B2
(45) Date of Patent: May 6, 2014

(54) SPREAD-CARRIER SELF-DETECTING CODE RECEIVER WITH SUMMED DELAY PROCESSING AND METHODS FOR SIGNAL ACQUISITION AND DETECTION

(75) Inventor: David G. Manzi, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/527,223

(22) Filed: Jun. 19, 2012

(65) Prior Publication Data

US 2013/0121382 A1 May 16, 2013

Related U.S. Application Data

(60) Provisional application No. 61/557,960, filed on Nov. 10, 2011.

(51) Int. Cl.
   *H04B 1/707* (2011.01)
(52) U.S. Cl.
   USPC ........... 375/152; 375/130; 375/140; 375/147; 375/149; 375/150; 375/316; 375/346
(58) Field of Classification Search
   USPC ......... 375/152, 130, 140, 147, 149, 150, 316, 375/346
   See application file for complete search history.

(56) References Cited

U.S. PATENT DOCUMENTS

| | | | |
|---|---|---|---|
| 5,090,024 A | 2/1992 | Vander Mey et al. | |
| 5,724,383 A | 3/1998 | Gold et al. | |
| 6,842,475 B2 * | 1/2005 | Jeong et al. | 375/130 |
| 6,959,030 B1 | 10/2005 | Clark | |
| 8,059,695 B2 | 11/2011 | Manzi | |
| 2001/0053177 A1 | 12/2001 | Papasakellariou | |
| 2003/0103475 A1 | 6/2003 | Keppe et al. | |
| 2003/0161383 A1 | 8/2003 | Mower | |
| 2003/0193993 A1 * | 10/2003 | Ho et al. | 375/149 |
| 2004/0042535 A1 | 3/2004 | Mayor et al. | |
| 2004/0180698 A1 | 9/2004 | Kamemura et al. | |
| 2007/0014384 A1 * | 1/2007 | Min et al. | 375/325 |
| 2008/0008230 A1 * | 1/2008 | Lee et al. | 375/150 |
| 2008/0288196 A1 | 11/2008 | Singh et al. | |
| 2009/0046764 A1 * | 2/2009 | Manzi | 375/139 |

FOREIGN PATENT DOCUMENTS

WO   WO-2013070309 A1   5/2013

OTHER PUBLICATIONS

U.S. Appl. No. 11/891,948, Non Final Office Action mailed May 18, 2010, 17 pgs.
U.S. Appl. No. 11/891,948, Non Final Office Action mailed Oct. 18, 2010, 18 pgs.

(Continued)

*Primary Examiner* — Siu Lee
(74) *Attorney, Agent, or Firm* — Schwegman, Lundberg =& Woessner, P.A.

(57) ABSTRACT

Embodiments of a spread-carrier self-detecting code (SCSDC) receiver with summed-delay processing (SDP) and method are generally described herein. In some embodiments, the SCSDC-SDP receiver is arranged to generate a chip-matched filter output from a received spread-spectrum signal and perform SDP on the chip-matched filter output with a plurality of delay-processing chains. The SDP may include multiplying a conjugated and delayed chip-matched filter output with the chip-matched filter output and applying a code-matched filter that is matched to a delay-multiplied code. The outputs from the code-matched filters of each delay-processing chain may be coherently combined to provide an output having correlation peaks for use generating frequency error and timing information.

19 Claims, 2 Drawing Sheets

(56) References Cited

OTHER PUBLICATIONS

U.S. Appl. No. 11/891,948, Notice of Allowance mailed Apr. 15, 2011, 7 pgs.
U.S. Appl. No. 11/891,948, Notice of Allowance mailed Sep. 7, 2011, 8 pgs.
U.S. Appl. No. 11/891,948, Response filed Feb. 17, 2011 to Non Final Office Action mailed Oct. 18, 2010, 7 pgs.
"International Application Serial No. PCT/US2012/054408, International Search Report mailed Nov. 19, 2012", 2 pgs.
"International Application Serial No. PCT/US2012/054408, Written Opinion mailed Nov. 19, 2012", 5 pgs.

* cited by examiner

Fig. 3

SPREAD-CARRIER SELF-DETECTING CODE RECEIVER WITH SUMMED DELAY PROCESSING AND METHODS FOR SIGNAL ACQUISITION AND DETECTION

PRIORITY CLAIM

This application claims priority under 35 USC 119 to U.S. Provisional Patent Application Ser. No. 61/557,960, filed Nov. 10, 2011 entitled "SYSTEM AND METHOD FOR SUMMED DELAY PROCESSING FOR SPREAD CARRIER SELF DETECTING CODES".

GOVERNMENT RIGHTS

This invention was not made with United States Government support. The United States Government does not have certain rights in this invention.

TECHNICAL FIELD

Embodiments pertain to spread-spectrum communications. Some embodiments relate to direct-sequence spread-spectrum (DSSS) receivers including chip-matched filter (CMF) receivers. Some embodiments relate to signal detection and acquisition in spread-spectrum communication systems. Some embodiments relate to spread-carrier self-detecting codes. Some embodiments relate to CDMA communications. Some embodiments relate to RADAR, systems. Some embodiments relate to airborne systems.

BACKGROUND

One issue with many spread-spectrum receivers is their sensitivity to frequency error. This frequency-error sensitivity is particularly a concern in challenging environments because it can reduce signal acquisition time. Some spread-spectrum receivers, although robust in the presence of frequency errors, may suffer from degradation of overall performance with respect to increasing noise levels (e.g., noise squaring loss).

Thus there are general needs for improved spread-spectrum receivers and methods that reduce the frequency-error sensitivity and provide improved signal acquisition time. There are also general needs for improved spread-spectrum receivers and methods that help recover losses caused by noise squaring loss.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
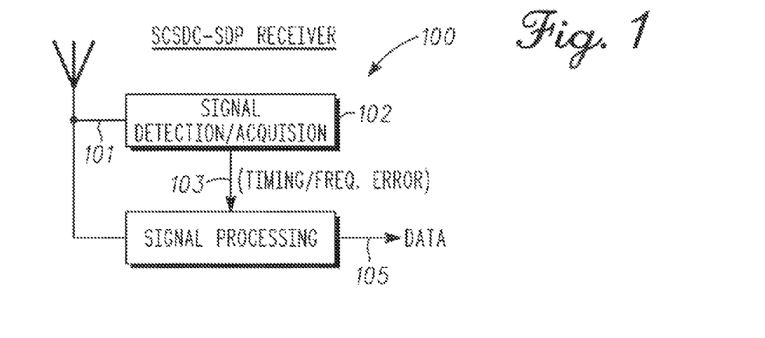
FIG. 1 is a functional diagram of a spread-carrier self-detecting code (SCSDC) summed-delay processing (SDP) (SCSDC-SDP) receiver in accordance with some embodiments.

FIG. 1 is a functional diagram of a SCSDC-SDP receiver in accordance with some embodiments. SCSDC-SDP receiver 100 may include a signal detection and acquisition circuitry 102 and signal processing circuitry 104. In accordance with embodiments, the signal detection and acquisition circuitry 102 may receive a spread spectrum signal r(t) 101 through one or more antennas and generate frequency error and timing information 103. The frequency error and timing information 103 may be provided to signal processing circuitry 104 of the SCSDC-SDP receiver 100 for processing a data portion of the received spread-spectrum signal r(t) 101 to generate output data 105. In these embodiments, the signal detection and acquisition circuitry 102 may operate on a preamble portion of the spread-spectrum signal r(t) 201.

In accordance with embodiments, the signal detection and acquisition circuitry 102 may include a chip-matched filter to receive the spread-spectrum signal 101 and generate a chip-matched filter output. The spread-spectrum signal 101 may have a chip period ($T_c$) and may have been spread at the transmitter with a spreading code. In accordance with these embodiments, the signal detection and acquisition circuitry 102 may also include a plurality of delay-processing chains. In these embodiments, each delay-processing chain may delay the chip-matched filter output by an amount ($\tau_i$) that is a different integer multiple of the chip period, may conjugate the delayed chip-matched filter output, and may multiply the conjugated delayed chip-matched filter output with the chip-matched filter output to generate a multiplied signal output. In these embodiments, each delay-processing chain may include a code-matched filter that may be applied to the multiplied signal output.

In some embodiments, the outputs from the code-matched filters of each delay-processing chain may be combined to provide a combined output having correlation peaks that may correspond to transmitted bits of the received spread-spectrum signal. The phase of each correlation peak may be indicative of a frequency error of the received spread-spectrum signal 101. In some embodiments, frequency error and timing information 103 may be generated from the combined output of the delay-processing chains for use by signal processing circuitry 104 in processing a data signal to generate the output data 105.

In some embodiments, each delay-processing chain may operate as a Spread-Carrier Self-Detecting Code (SCSDC) chain, and together, the plurality of these delay-processing chains may be configured to perform summed-delay processing (SDP) for the SCSDC-SDP receiver 100. Some of these embodiments may make use of self-referential detection of a direct-sequence spread-spectrum (DSSS) signal. By treating the signal as its own carrier, a new signal is presented to be operated upon. U.S. Pat. No. 8,059,695 relates to SCSDC receivers, which is assigned to same assignee as the present application, is incorporated herein by reference. In accordance with some embodiments, parallelization of processing is performed by a set of delay-processing chains to increase coherence by taking advantage of certain statistical aspects of the received signal and noise. As discussed above, the outputs of multiple delay-processing chains, each with its own delay value, may be summed together to recover the signal-to-noise ratio (SNR) that may be lost by SCSDC processing alone.

In accordance with embodiments, the SCSDC-SDP receiver 100 provides the capability to receive phase-shift keyed (PSK) signals with large frequency errors and receive signals in environments that cannot maintain phase coherence over significant durations. Accordingly, the SCSDC-SDP receiver 100 receiver may use less expensive frequency references or operate in challenging environments and may take advantage of spread spectrum signaling schemes (e.g. Code Division Multiple Access (CDMA)). The techniques disclosed herein also may be employed as part of a base modulation scheme or as part of a preamble to allow for broader frequency capture capabilities.

SCSDC receivers, although robust in the presence of frequency errors, may suffer from degradation of overall performance with respect to increasing noise levels (e.g., noise squaring loss). The embodiments of the SCSDC-SDP receiver 100 disclosed herein apply summed delay processing to SCSDC techniques to recover losses caused by noise squaring loss. These embodiments allow the SCSDC-SDP receiver 100 to trade signal sensitivity for frequency capture range. These embodiments are discussed in more detail below.

Although the SCSDC-SDP receiver 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of the SCSDC-SDP receiver 100 may refer to one or more processes operating on one or more processing elements.

Figure 2:
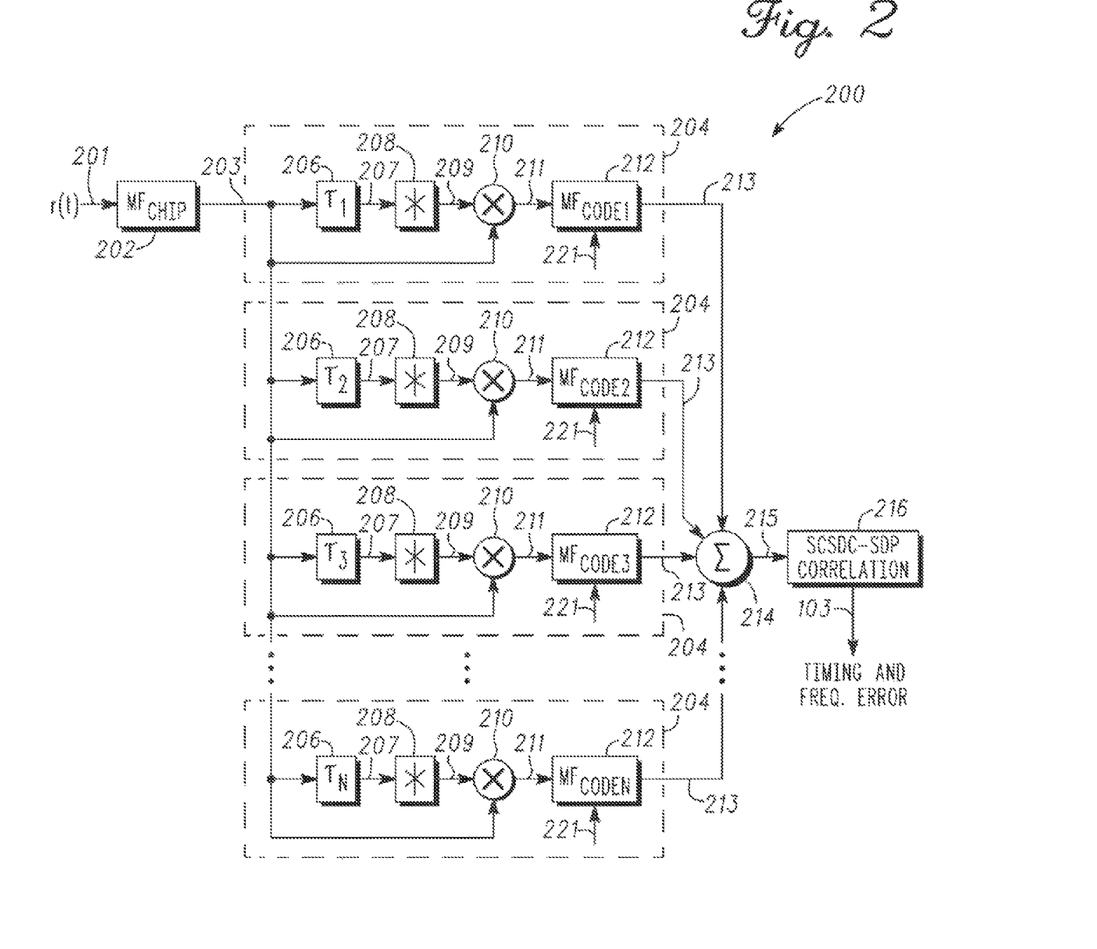
FIG. 2 is a block diagram of a signal detection and acquisition circuitry in accordance with some embodiments.

FIG. 2 is a block diagram of a signal detection and acquisition circuitry in accordance with some embodiments. Signal detection and acquisition circuitry 200 may be suitable for use as signal detection and acquisition circuitry 102 (FIG. 1) although other configurations may also be suitable. Signal detection and acquisition circuitry 200 may include a chip-matched filter 202 ($MF_{code}$) to receive a spread-spectrum signal r(t) 201 and generate a chip-matched filter output 203. The signal detection and acquisition circuitry 200 may also include a plurality of delay-processing chains 204. The signal detection and acquisition circuitry 200 may also include a combining element 214 to combine (e.g., by summing) outputs from the delay-processing chains 204 to provide a combined output 215 having correlation peaks that correspond to transmitted bits of the received spread-spectrum signal 201.

In some embodiments, each delay-processing chain 204 may include a delay element 206 to delay the chip-matched filter output 203 by the amount ($\tau_i$) that is a different integer multiple of the chip period ($T_c$) for each chain and generate the delayed chip-matched filter output 207. Each delay-processing chain 204 may include a conjugate element 208 to conjugate the delayed chip-matched filter output 207 and generate the conjugated delayed chip-matched filter output 209. Each delay-processing chain 204 may also include a multiplication element 210 to multiply the conjugated delayed chip-matched filter output 209 with the chip-matched filter output 203 to generate the multiplied signal 211. Each delay-processing chain 204 may also include a code-matched filter 212 ($MF_{code}$) for application to output of the multiplication element 210.

In accordance with embodiments, each code-matched filter 212 of an associated delay-processing chain 204 may be matched to a different delay-multiplied code 221. The delay-multiplied codes 221 may be generated from the spreading code and a delayed version of the spreading code that is delayed based on the integer value of the chip period for the associated delay-processing chain.

In some embodiments, the spreading code may be a pseudo-noise PN code, although the scope of the embodiments is not limited in this respect. In some embodiments, the delay-multiplied code $MF_{code}$ for processing chain 'i' $MF_{code}$ i 212 is a matched filter for $PN_i$, where $PN_i$ is the resulting PN code generated by circularly XORing the transmitted PN code with itself shifted by 'i' chips. In some embodiments, the delay for processing chain 'i' $\tau_i$ may be set to $d_i T_c$ where $d_i$ is a positive integer and $T_c$ is the chip period. Accordingly, each delay-processing chain 204 may utilize a different integer multiple of the chip period $T_c$ for a delay and a different code-matched filter.

In some embodiments, the delay-multiplied code 221 for an associated delay-processing chain 204 may be generated by circularly XORing the spreading code and the delayed version of the spreading code for the delay-processing chain 204. In these embodiments, the delay-multiplied code 221 for each delay-processing chain 204 may be different because the delayed version of the spreading code for the delay-processing chain 204. Accordingly, the code-matched filter 212 for each delay-processing chain 204 would also be different.

In accordance with embodiments, the phase of each correlation peak of combined output 215 may be indicative of a frequency error of the received spread-spectrum signal 201. In these embodiments, frequency error may be measured, however this is unlike some conventional DSSS receivers in which a correlation peak is indicative of phase.

In some embodiments, the signal detection and acquisition circuitry 200 may also include timing and frequency error estimation circuitry 216 to generate a frequency error and timing information 103 from the combined output 215. The frequency error and timing information 103 may be provided to signal processing circuitry 104 (FIG. 1) of the spread-spectrum receiver 100 for processing a data portion of the received spread-spectrum signal r(t) 101. In these embodiments, the signal detection and acquisition circuitry 102 may operate on a preamble portion of the spread-spectrum signal r(t) 201.

In these embodiments, the location of maximum correlation (i.e., the very top of the correlation peak) constitutes the timing information. Localization of the maximum correlation may provide timing information and the phase of the maximum correlation provides the frequency estimate.

In some embodiments, the chip-matched filter 202 may matched to the chip rate. In these embodiments, the chip-matched filter 202 may also be matched to the signal bandwidth and/or the shape of the transmitted signal. In accordance with some embodiments, the chip-matched filter 202 acts to limit the noise bandwidth into the rest of the processing chain. The chip-matched filter 202 may also serve to optimally collect the energy of the chips in the received signal 201. Tradeoffs may be made between optimal matched filter performance and desired processing bandwidth. In these embodiments, the chip-matched filter may be based on the chip period.

In some embodiments, the number N of delay-processing chains 204 of the plurality is selected based on a desired frequency capture range (i.e., frequency error sensitivity) and a desired signal sensitivity (e.g., SNR) of the spread-spectrum receiver 100. A greater number of delay-processing chains 204 may be selected for increased signal sensitivity and reduced frequency capture range. A lesser number of delay-processing chains 204 may be selected for increased frequency capture range and reduced signal sensitivity. In some embodiments, the number of delay-processing chains 204 N may range from as few as two to as great as ten or more. In some embodiments, the number of delay-processing chains 204 operating with the spread-spectrum receiver 100 may be dynamically changed during operation to trade off receiver sensitivity and frequency capture range.

In some embodiments, a practical limit for the shifts provided by any of delay elements 206 is the code length of the transmitted signal. Although the embodiments illustrated in FIG. 2 have contiguous shifts between the different delay processing chains 204 (e.g. shifts of contiguous integer values of 1, 2, 3, 4, and 5 times the chip rate), although this is not a requirement. In some other embodiments, the shifts between different delay processing chains 204 is not contiguous and may selected by based on a particular usage scenario or system requirement.

In some embodiments, the delay-processing chains 204 may be configured to delay the chip-matched filter output 203 by contiguous integer values of the chip period. In some alternate embodiments, the delay-processing chains 204 may be configured to delay the chip-matched filter output 203 by non-contiguous integer values of the chip period. In these alternate embodiments, the first delay-processing chain 204 may delay the chip-matched filter output 203 by one times the chip period, the second delay-processing chain 204 may delay the chip-matched filter output 203 by three times the chip period, the third delay-processing chain 204 may delay the chip-matched filter output 203 by five or six times the chip period, etc.

In some embodiments, the combining element 214 may be arranged to coherently combine the outputs from the code-matched filters 212 of each delay-processing chain 204. In some of these embodiments, the combining element 214 may sum the outputs from the code-matched filters 212. In these embodiments, coherent combining occurs because as long as the delays are different for every branch, the noise resulting at the branch outputs will be independent and thus uncorrelated with one another. As long as the code-matched filters are selected properly, the signal content at the output of each branch may be correlated.

In some embodiments, correlation peaks from each of the code-matched filters 212 may be aligned since their codes are delayed by integer values of the chip period. As long as the proper code-matched filters are selected, the peaks will align. If the peaks do not align, then part of the summation operation may include providing the proper delay for each branch output to bring them into alignment so that there are coherent gains at the peak locations.

In accordance with embodiments, the code-matched filters 212 may act to collect the energy of a spreading code. The nature of these filters 212 may depend on the selection of the chip-matched filter 202. In the extreme, if the chip-matched filter 202 is simply an impulse all pass filter, then the desired code-matched filter 212 will be a correlation filter for the code with the chips fully represented in the filter response. If, in the other extreme, the chip-matched filter 202 is a true matched filter for the chip pulse shape, then the code-matched filter will be a series of impulses, separated by the chip period and will, when convolved with the chip-matched filter 202, fully represent a correlation filter for the received signal. Other embodiments of these filters may be used depending on the specific needs of the implementation.

Accordingly, embodiments disclosed herein may apply SDP to an SCSDC receiver to provide improved SNR as well as increased frequency capture range.

A standard DSSS receiver, for example, requires frequency errors typically less than one-half the symbol rate (e.g. a 100 kbps link (BPSK) with a 10 Mchip rate (i.e., a 100:1 spreading ratio) will occupy a bandwidth of 10-20 MHz in the channel but will require frequency errors to be constrained to ±50 kHz. An SCSDC receiver may be able to tolerate frequency errors on the order of the chip rate (±10 MHz in the above example). However it may suffer from significant noise due to the noise squaring effect, so there is SNR dependence. From example above, the equivalent performance at an SNR of 20 dB, a 1 dB performance hit for every dB reduction of SNR from that point. For example, a DSSS receiver operates at 13 dB SNR. A SCSDC receiver may have 100 times the capture range but will be experiencing an SNR of 6 dB at that point. For example, a DSSS receiver operates at 10 dB SNR and an SCSDC receiver will have 100 times the capture range but will be experiencing an SNR of 0 dB at that point.

In accordance with embodiments, SDP allows the designer to buy back SNR by trading capture range. From prior example: Utilizing 2 shifts, the equivalent performance is now reached at 17 dB SNR. In a DSSS receiver operating at 13 dB, a SCSDC-SDP system (2 shifts) will have 50 times the capture range but will experience a 9 dB SNR. In a DSSS receiver operating at 10 dB, a SCSDC-SDP system (2 shifts) will have 50 times the capture range but will experience a 3 dB SNR. The SDP operation provides an SNR improvement over SCSDC equivalent to the number of shifts. For example, two 2 shifts may provide a 3 dB improvement, and four shifts may provide a 6 dB improvement. Furthermore, the SDP operation trades capture range linearly. For example, two shifts results in half the capture range, and four shifts may result in one-fourth the capture range.

In some embodiments, the SCSDC-SDP receiver 100 provides a way of accurately achieving signal acquisition from both a time and frequency standpoint while still maintaining reasonable sensitivity when compared to an ideal DSSS receiver. In these embodiments, no new signal transmission methods are required and the complexity of the SCSDC-SDP receiver 100 is tunable. In some embodiments, the SCSDC-SDP receiver 100 provides a way to maintain anti-jam immunity via DSSS signaling even in scintillating (e.g. nuclear plasma) environments. In some embodiments, the SCSDC-SDP receiver 100 may reduce overhead necessary for signal detection and alignment thus improving overall data link throughput in relevant systems.

The SCSDC-SDP receiver 100 may be suitable for use in RADAR systems, geolocation systems, and communications systems and provides rapid signal detection and instantaneous frequency measurement capabilities. In some embodiments, the SCSDC-SDP receiver 100 may be suitable for use in many wireless communication systems. The ability of the SCSDC-SDP receiver 100 to facilitate rapid acquisition of signals in the presence of large frequency errors may allow for use of less accurate frequency references and may allow for a reduction in overhead associated with signal detection and acquisition. In some embodiments, the SCSDC-SDP receiver 100 may be suitable for use in acquisition of certain waveforms, although the scope of the embodiments is not limited in this respect.

Although signal detection and acquisition circuitry 200 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, ASICs, RFICs and combinations of various hardware and logic circuitry for performing at least the functions described herein. In some embodiments, the functional elements of signal detection and acquisition circuitry 200 may refer to one or more processes operating on one or more processing elements.

Figure 3:
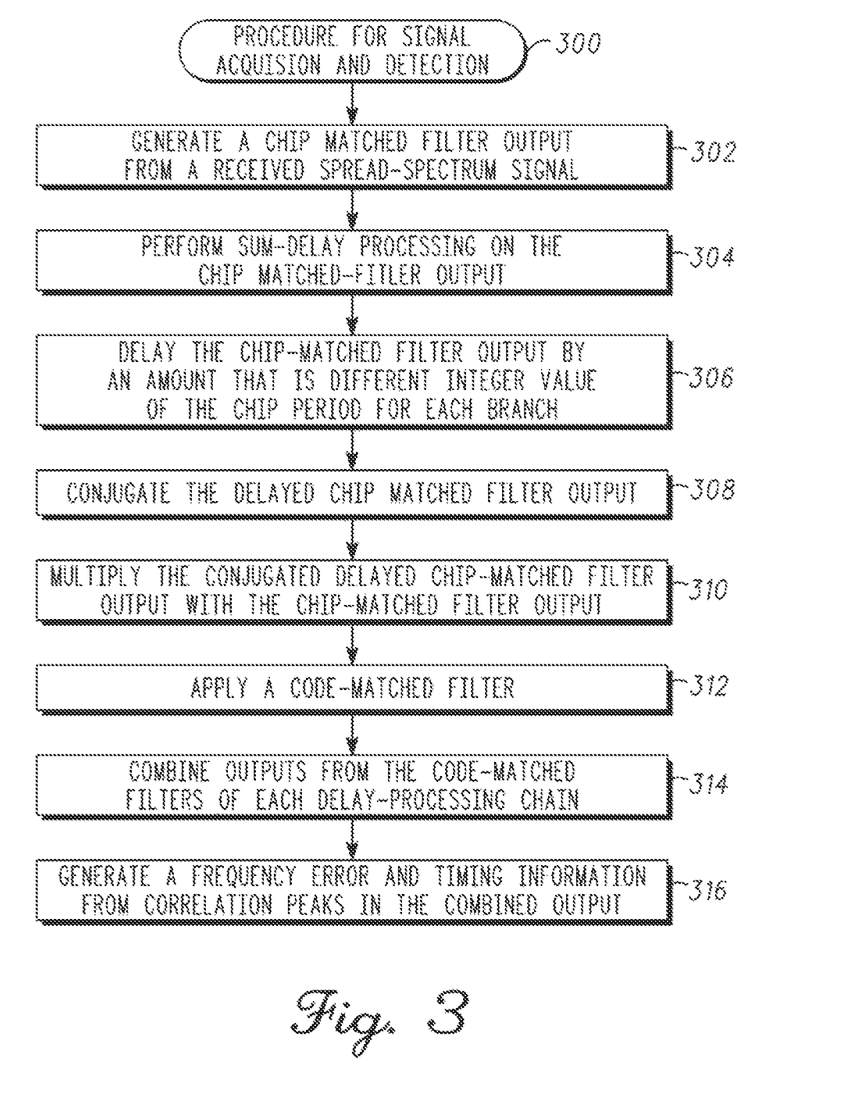
FIG. 3 is a procedure for signal detection and acquisition in accordance with some embodiments.

FIG. 3 is a procedure for signal detection and acquisition in accordance with some embodiments. Procedure 300 may be performed by a spread-spectrum receiver, such as SCSDC-SDP receiver 100 (FIG. 1). In some embodiments, the operations of procedure may be performed by signal processing circuitry 104 (FIG. 1) and may include performing summed-delay processing using spread-carrier self-detecting code techniques.

Operation 302 comprises generating a chip-matched filter output from a received spread-spectrum signal. In some embodiments, operation 302 may be performed by chip-matched filter 202 (FIG. 2).

Operation 304 comprises performing sum-delay processing on the chip-matched filter output. In some embodiments, the sum-delay processing may comprise operations 306 through 314 and may be performed by delay processing chains 204 (FIG. 2) and combining element 214 (FIG. 2).

Operation 306 comprises delaying the chip-matched filter output by the amount that is a different integer multiple of the chip period for each chain and generating a delayed chip-matched filter output. In some embodiments, delay elements 206 (FIG. 2) may perform operation 306.

Operation 308 comprises conjugating the delayed chip-matched filter output and generating the conjugated delayed chip-matched filter output. In some embodiments, conjugate elements 208 (FIG. 2) may perform operation 308.

Operation 310 comprises multiplying the conjugated delayed chip-matched filter output with the chip-matched filter output to generate the multiplied signal. In some embodiments, operation 310 may be performed by multiplication elements 310 (FIG. 2).

Operation 312 comprises applying code-matched filters to the multiplied signals generated in operation 310. Each code-matched filter of an associated delay-processing chain may be matched to a different delay-multiplied code and the delay-multiplied codes may have been generated from the spreading code and a delayed version of the spreading code that is delayed based on the integer value of the chip period for the associated delay-processing chain. In some embodiments, code-matched filters 212 (FIG. 2) may be configured to perform operation 312.

Operation 314 comprises combining outputs from the code-matched filters of each delay-processing chain to provide a combined output. In some embodiments, the combining element 214 may be arranged to perform operation 214. The combined output may have correlation peaks that correspond to transmitted bits of the received spread-spectrum signal.

Operation 316 comprises generating a frequency error and timing information 103 from the correlation peaks of the combined output. In some embodiments, operation 316 may be performed by timing and frequency error estimation circuitry 216 (FIG. 2).

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, SCSDC-SDP receiver 100 (FIG. 1) may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A spread-carrier self-detecting code (SCSDC) summed-delay processing (SDP) (SCSDC-SDP) receiver comprising:
   a chip-matched filter to generate a chip-matched filter output from a received spread-spectrum signal having a chip period and spread with a spreading code, the chip-matched filter being matched to a chip rate of the spread-spectrum signal; and
   a plurality of delay-processing chains to perform sum-delay processing on the chip-matched filter output by multiplying a conjugated and delayed chip-matched filter output with the chip-matched filter output and applying a code-matched filter,
   wherein each code-matched filter of an associated delay-processing chain is matched to a different delay-multiplied code.

2. The SCSDC-SDP receiver of claim 1 further arranged to combine outputs from the code-matched filters of each delay-processing chain to provide a combined output having correlation peaks that correspond to transmitted bits of the received spread-spectrum signal.

3. The SCSDC-SDP receiver of claim 2 wherein each delay processing chain is to delay the chip-matched filter output by an amount that is a different integer multiple of the chip period for each branch, conjugate the delayed chip-matched filter output, multiply the conjugated delayed chip-matched filter output with the chip-matched filter output to generate a multiplied signal, and apply the code-matched filter to the multiplied signal.

4. The SCSDC-SDP receiver of claim 3 wherein a number of delay-processing chains of the plurality is selected based on a frequency capture range and a signal sensitivity of the SCSDC-SDP receiver.

5. The SCSDC-SDP receiver of claim 4 wherein a greater number of delay-processing chains is selected for increased signal sensitivity and reduced frequency capture range, and a lesser number of delay-processing chains is selected for increased frequency capture range and reduced signal sensitivity.

6. A method for signal acquisition and detection comprising:
   generating a chip-matched filter output from a received spread-spectrum signal having a chip period and spread with a spreading code;
   performing sum-delay processing with a plurality of delay-processing chains on the chip-matched filter output by multiplying a conjugated and delayed chip-matched filter outputs with the chip-matched filter output and applying a code-matched filters that is are matched to a delay multiplied codes; and
   coherently combining outputs from the code-matched filters of each delay-processing chain to provide a combined output,
   wherein the combined output has correlation peaks that correspond to transmitted bits of the received spread-spectrum signal, and wherein the method further comprises generating frequency error and timing information from the correlation peaks.

7. The method of claim 6 wherein each code-matched filter of an associated delay-processing chain is matched to a different delay-multiplied code, the delay-multiplied codes being generated from the spreading code and a delayed version of the spreading code that is delayed based on the integer value of the chip period for the associated delay-processing chain.

8. Signal detection and acquisition circuitry for use in a spread-spectrum receiver, the signal detection and acquisition circuitry comprising:
- a chip-matched filter to receive a spread-spectrum signal and generate a chip-matched filter output, the spread-spectrum signal having a chip period and spread with a spreading code, the chip-matched filter being matched to a chip rate of the spread-spectrum signal;
- a plurality of delay-processing chains, each delay processing chain to delay the chip-matched filter output by an amount that is a different integer multiple of the chip period, conjugate the delayed chip-matched filter output, multiply the conjugated delayed chip-matched filter output with the chip-matched filter output to generate a multiplied signal, and apply a code-matched filter to the multiplied signal, each code-matched filter of an associated delay-processing chain being matched to a different delay-multiplied code; and
- a combining element to combine outputs from the code-matched filters of each delay-processing chain to provide a combined output having correlation peaks that correspond to transmitted bits of the received spread-spectrum signal.

9. The signal detection and acquisition circuitry of claim 8 wherein the delay-multiplied codes are generated from the spreading code and a delayed version of the spreading code that is delayed based on the integer value of the chip period for the associated delay-processing chain.

10. The signal detection and acquisition circuitry of claim 9 wherein each delay-processing chain includes:
- a delay element to delay the chip-matched filter output by the amount $\tau_i$ that is a different integer multiple of the chip period for each branch and generate the delayed chip-matched filter output;
- a conjugate element to conjugate the delayed chip-matched filter output and generate the conjugated delayed chip-matched filter output; and
- a multiplication element to multiply the conjugated delayed chip-matched filter output with the chip-matched filter output to generate the multiplied signal for application of the code-matched filter for the associated delay-processing chain.

11. Signal detection and acquisition circuitry for use in a spread-spectrum receiver, the signal detection and acquisition circuitry comprising:
- a chip-matched filter to receive a spread-spectrum signal and generate a chip-matched filter output, the spread-spectrum signal having a chip period and spread with a spreading code;
- a plurality of delay-processing chains, each delay processing chain to delay the chip-matched filter output by an amount that is a different integer multiple of the chip period, conjugate the delayed chip-matched filter output, multiply the conjugated delayed chip-matched filter output with the chip-matched filter output to generate a multiplied signal, and apply a code-matched filter to the multiplied signal; and
- a combining element to combine outputs from the code-matched filters of each delay-processing chain to provide a combined output having correlation peaks that correspond to transmitted bits of the received spread-spectrum signal,
- wherein each code-matched filter of an associated delay-processing chain is matched to a different delay-multiplied code, the delay-multiplied codes being generated from the spreading code and a delayed version of the spreading code that is delayed based on the integer value of the chip period for the associated delay-processing chain, and
- wherein the delay-multiplied code for an associated delay-processing chain is generated by circularly XORing the spreading code and the delayed version of the spreading code for the delay-processing chain.

12. Signal detection and acquisition circuitry for use in a spread-spectrum receiver, the signal detection and acquisition circuitry comprising:
- a chip-matched filter to receive a spread-spectrum signal and generate a chip-matched filter output, the spread-spectrum signal having a chip period and spread with a spreading code;
- a plurality of delay-processing chains, each delay processing chain to delay the chip-matched filter output by an amount that is a different integer multiple of the chip period, conjugate the delayed chip-matched filter output, multiply the conjugated delayed chip-matched filter output with the chip-matched filter output to generate a multiplied signal, and apply a code-matched filter to the multiplied signal; and
- a combining element to combine outputs from the code-matched filters of each delay-processing chain to provide a combined output having correlation peaks that correspond to transmitted bits of the received spread-spectrum signal,
- wherein each code-matched filter of an associated delay-processing chain is matched to a different delay-multiplied code, the delay-multiplied codes being generated from the spreading code and a delayed version of the spreading code that is delayed based on the integer value of the chip period for the associated delay-processing chain, and
- wherein a phase of each correlation peak is indicative of a frequency error of the received spread-spectrum signal.

13. The signal detection and acquisition circuitry of claim 12 further comprising timing and frequency error estimation circuitry to generate a frequency error and timing information based on the correlation peaks from the combined output.

14. The signal detection and acquisition circuitry of claim 13 wherein the chip-matched filter is matched to a chip rate of the spread-spectrum signal.

15. The signal detection and acquisition circuitry of claim 14 wherein a number of delay-processing chains of the plurality is selected based on a frequency capture range and a signal sensitivity of the spread-spectrum receiver.

16. The signal detection and acquisition circuitry of claim 15 wherein a greater number of delay-processing chains is selected for increased signal sensitivity and reduced frequency capture range, and a lesser number of delay-processing chains is selected for increased frequency capture range and reduced signal sensitivity.

17. The signal detection and acquisition circuitry of claim 15 wherein the delay-processing chains are configured to delay the chip-matched filter output by contiguous integer values of the chip period.

18. The signal detection and acquisition circuitry of claim 15 wherein the delay-processing chains are configured to delay the chip-matched filter output by non-contiguous integer values of the chip period.

19. The signal detection and acquisition circuitry of claim 15 wherein the combining element is arranged to coherently combine the outputs from the code-matched filters of each delay-processing chain.

\* \* \* \* \*

UNITED STATES PATENT AND TRADEMARK OFFICE
CERTIFICATE OF CORRECTION

PATENT NO. : 8,718,119 B2
APPLICATION NO. : 13/527223
DATED : May 6, 2014
INVENTOR(S) : David G. Manzi It is certified that error appears in the above-identified patent and that said Letters Patent is hereby corrected as shown below:

In the drawings,

On sheet 1 of 2, Fig. 1, reference numeral 102, delete "ACQUISION" and insert --ACQUISITION--, therefor On sheet 1 of 2, Fig. 1, insert --104--, therefor On sheet 2 of 2, Fig. 3, reference numeral 300, delete "ACQUISION" and insert --ACQUISITION--, therefor On sheet 2 of 2, Fig. 3, reference numeral 304, delete "FITLER" and insert --FILTER--, therefor In the specification, In column 1, line 30, delete "RADAR," and insert --RADAR--, therefor In column 3, line 39, delete "($MF_{code}$)" and insert --($MF_{CHIP}$)--, therefor In column 6, line 26, before "shifts", delete "2", therefor In column 7, line 33, delete "310" and insert --210--, therefor In column 7, line 47, delete "214." and insert --314.--, therefor In the claims, In column 8, line 60, in Claim 6, after "is", delete "are", therefor In column 8, line 61, in Claim 6, delete "delay multiplied" and insert --delay-multiplied--, therefor Signed and Sealed this
Twenty-second Day of September, 2015

Michelle K. Lee
*Director of the United States Patent and Trademark Office*